Jan. 23, 1940.  W. C. BREDENBECK  2,188,198
TOOL POST CONSTRUCTION
Filed Nov. 22, 1938  2 Sheets-Sheet 1

INVENTOR.
William C. Bredenbeck.
BY
Richey & Watts
ATTORNEYS.

Jan. 23, 1940.  W. C. BREDENBECK  2,188,198
TOOL POST CONSTRUCTION
Filed Nov. 22, 1938  2 Sheets-Sheet 2
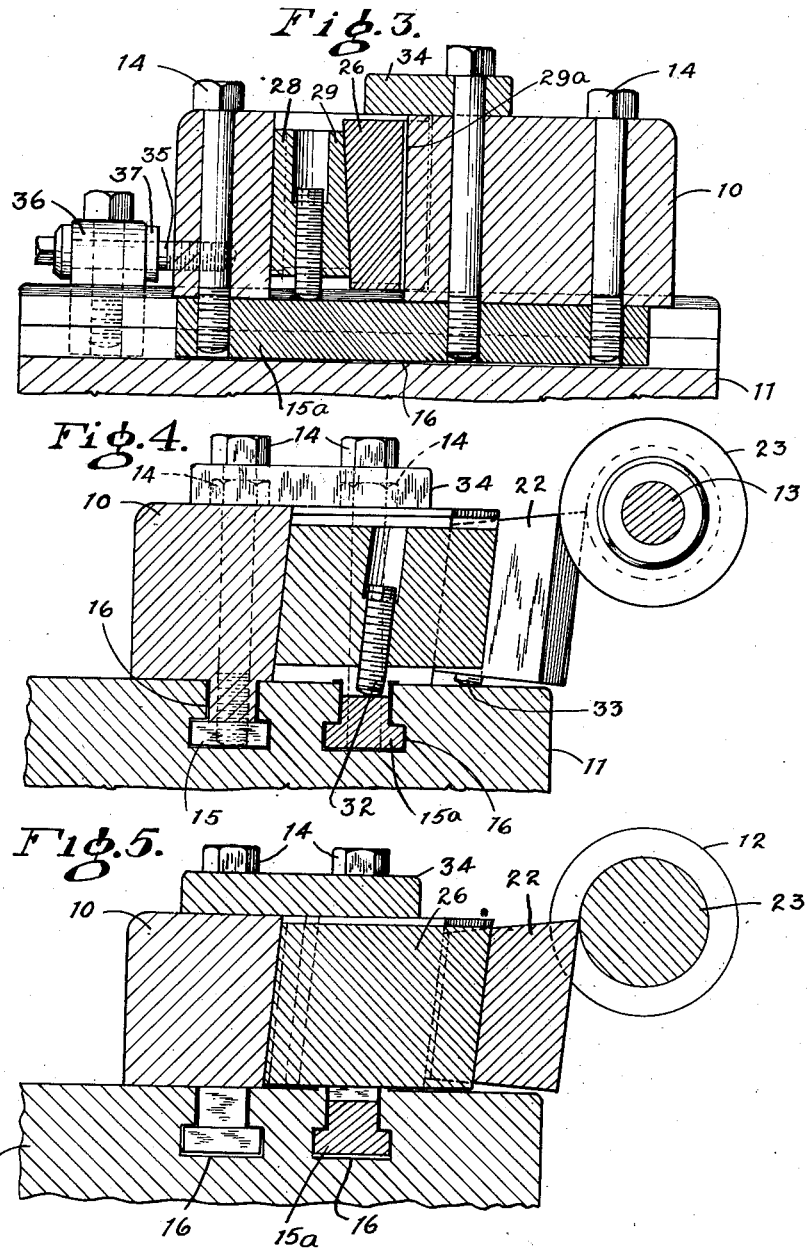
INVENTOR.
William C. Bredenbeck.
BY
ATTORNEYS.

Patented Jan. 23, 1940

2,188,198

UNITED STATES PATENT OFFICE 2,188,198

TOOL POST CONSTRUCTION

William C. Bredenbeck, Cleveland, Ohio, assignor to The Cleveland Automatic Machine Company, Cleveland, Ohio, a corporation of Ohio Application November 22, 1938, Serial No. 241,749

3 Claims. (Cl. 82—36)

This invention relates broadly to machine tools and more specifically to tool holders for lathes and similar metal working machines.

The primary object of the invention is to provide a tool holder which is constructed to facilitate the ready adjustment of the tool bit or cutter in relation to the work and the securement of the tool in such a manner as to prevent movement thereof while being clamped in operative position.

Another object of the invention is to provide a tool holder for form tools or similar broad face cutters which is constructed to resist the vibration reactions imposed thereon while in use and to facilitate the alignment of the tool in relation to the axis of the work.

Another object of the invention is to provide a tool holder which is economic of manufacture, sturdy of structure and adapted for use with diversified types of work.

Other objects and advantages more or less ancillary of the foregoing and the manner in which all the various objects are realized will appear in the following description which, considered in connection with the accompanying drawings, sets forth the preferred embodiment of the invention.

As shown in the drawings wherein the preferred embodiment of the invention is disclosed:

Figure 1:
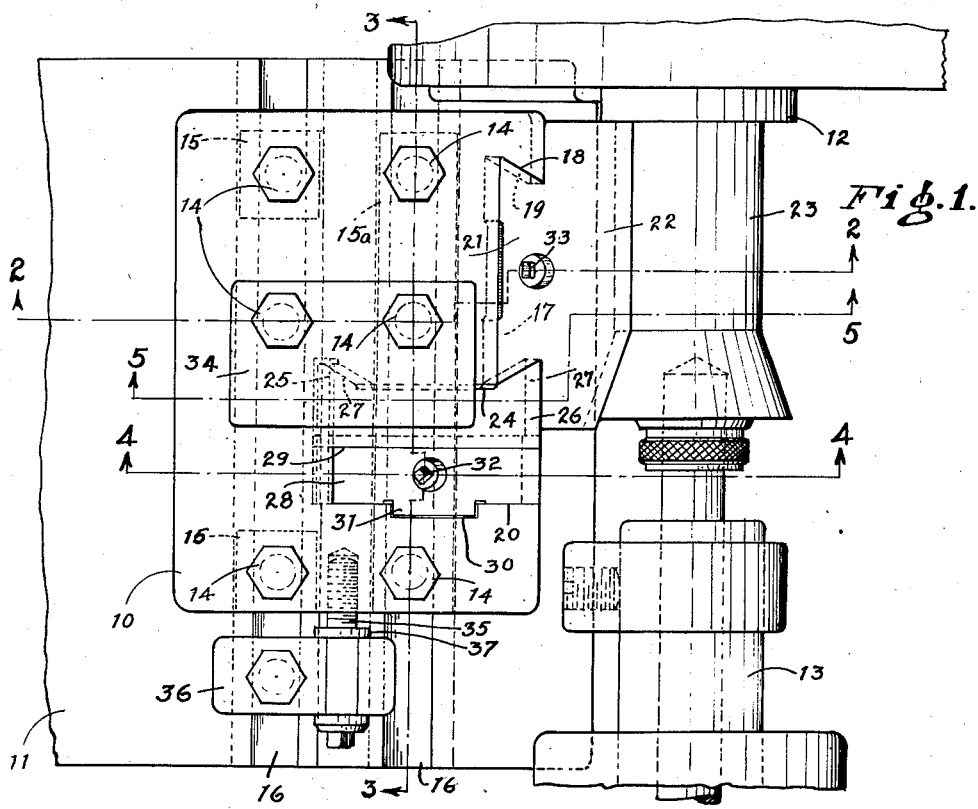
Fig. 1 is a plan view of the improved tool holder including certain fragmentary portions of a lathe.

Fig. 3 is a vertical longitudinal section through the tool holder, the section being taken on the line 3—3 of Fig. 1; and Figs. 4 and 5 are vertical transverse sectional views of the tool holder and tool bit, the sections being taken on the lines 4—4 and 5—5 respectively in Fig. 1.

Figure 2:
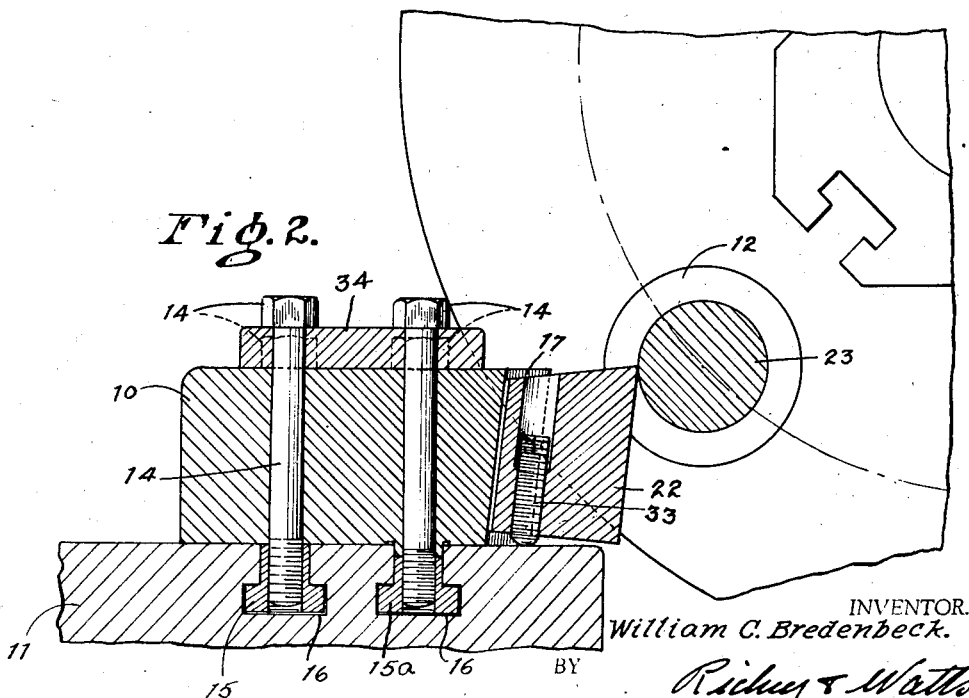
Fig. 2 is a vertical transverse section of the tool holder and coordinated parts of the lathe shown in Fig. 1, the section being taken on a plane indicated by the line 2—2 in Fig. 1.

As illustrated in Fig. 1, the improved tool holder 10 is mounted upon the lathe cross slide 11 which is organized for reciprocative movement towards and away from the axis of the lathe collet 12 and dead center 13. The tool holder is secured upon the cross slide 11 in the customary manner by cap screws 14 secured in threaded engagement with blocks 15 and 15a retained in T-slots 16 in the face of the cross slide 11. The tool holder 10 is formed with a recess 17 in the forward face thereof defined by a ledge 18 having an inclined beveled face 19 on the inner edge thereof and an opposed vertical wall 20 normal the forward face of the holder. The forward face of the tool holder and the major portion of the rearward face of the recess 17 are parallel and inclined downwardly and inwardly as shown in Figs. 2 and 5.

The recess 17 is provided for the support of a beveled inclined tenon 21 formed in the rearward wall of the cutter 22 which, as illustrated in the instant case comprises a form tool for shaving the body of the work piece 23 supported in the collet 12. The upper and forward faces of the cutter 22 are ground with the customary rake and clearance for the effective operation of the tool.

Adjacent the recess 17 there is a slot 24 having an inclined angular groove 25 adjacent the inner rearward edge thereof. Within the slot 24 there is a block 26 formed with inclined beveled ledges 27 in the outer ends of a side wall thereof, the bevel, inclination and proportion of the faces of the ledges 27 being complemental to the groove 25 in the holder 10 and beveled face of the tenon 21 in the cutter 22.

Within the slot 24 adjacent the block 26 there is a wedge plate 28, the tapered face 29 thereof being inclined at the same angle as that formed in the rearward face of the block 26. The side wall of the slot 24 is formed with a key seat 30 adapted for the reception of a tongue 31 machined in the vertical wall 29—a of the wedge plate 28. The wedge is drilled and tapered for the reception of a jack screw 32 arranged to abut the upper face of the block 15—a and provided to facilitate the impinged engagement of the wedge with the block 26. The cutter 22 is also drilled and tapped for the reception of a jack screw 33 provided to facilitate the vertical adjustment of the cutter in relation to horizontal axis of the work.

Upon the upper face of the tool holder 10 there is a plate 34 preferably retained by a pair of the machine screws 14 which are employed for the retention of the tool holder upon the lathe cross slide 11. The plate 34 may, however, be secured directly to the holder should it be necessary or desirable to arrange supporting screws 14 in some other position. As shown in Figs. 1 and 3, the tool block may be longitudinally adjusted in relation to the T-slots 16 by a screw 35 engaged within a tapered hole in an end wall of a tool holder and rotatably supported within a block 36 clamped in one of the key slots 16 in the cross slide. The screw 35 is provided with a collar 37 affixed upon the body thereof adjacent its threaded end to facilitate the inward and outward movement of the tool holder 10 when the screws 14 are released and the block 36 is supported in its clamped relation upon the cross slide.

When it is desired to remove the cutter 22 for the purpose of regrinding or adjustment the plate 34 is first removed, then the jack screw is adjusted to break the impinged relation thereof with the block 26 so that the mortise formed by the tapered beveled ledge 18 in the tool holder 10 and ledge 27 in the block 26 will be enlarged and thus permit the tenon of the cutter to be lifted from the recess 17 in the tool holder. After grinding the cutter tenon 21 may be reinserted in the mortise defined by the recess 17 and ledges 18 and 27 respectively, and the jack screw 33, then suitably adjusted to bring the cutting edge of the tool into the desired position in relation to the work. The wedge jack screw 32 may then be tightened to elevate the wedge 28 into impinged relation with the block 26, thus causing the beveled ledge portion 27 thereof to impinge the cutter tenon and clamp the cutter in rigid engagement upon the tool holder. It is obvious that as the wedge 28 is elevated vertical movement of the block 27 will be arrested by the plate 34 and the clearance provided between the mortise and tenon in the holder and cutter will be taken up by the tapered, beveled ledges 27. Moreover, the alignment of the cutting edge of the tool with the work will be maintained since the tongue 30 in the wedge 28 will prevent lateral movement thereof during adjustment and the inclined faces of ledges in the block 26 will equalize the movement thereof as the wedge is drawn to its tightened position.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A lathe tool embodying a cutter, a beveled tenon thereon tapered outwardly and downwardly from the upper face of the cutter, a holder for said cutter having a slot therein and a tapered recess in the face thereof, a tapered, beveled ledge defining one of the walls of said recess and constituting a side wall of a mortise for the reception of said tenon, a block in said slot, a beveled, tapered ledge thereon constituting the opposed side wall of said mortise, a wedge in said slot engageable with said block for effecting the impinged engagement of the tapered ledge of the block with the cutter tenon, and a jack screw in said cutter for effecting the adjustment thereof.

2. A lathe tool comprising a cutter, a beveled tenon thereon, a holder therefor having a recess in the face thereof and a slot transverse said recess, the walls defining said slot being formed with a tapered bevel groove therein, the end portion of the holder defining one of the walls of said recess being formed with a beveled, tapered surface constituting a wall of a mortise for the reception of said tenon, a block in said slot, beveled, tapered ledges in the end portions thereof, one of said ledges being engaged within said groove and the other ledge being engaged with said tenon and constituting another wall of said mortise, the wall of said block opposite said ledges being tapered upwardly from the bottom of the block and a wedge engageable with the tapered wall of said block for the securement of the block, the cutter and the wedge in impinged relation.

3. A lathe tool embodying a cutter, a beveled tenon thereon, a holder therefor having a slot therein and a recess in the face thereof, a beveled ledge defining one of the walls of said recess and constituting a side wall of a mortise for the reception of said tenon, a block in said slot, a beveled ledge thereon constituting the opposed side wall of said mortise, a wedge in said slot adjacent said block, a jack screw in said wedge for effecting the vertical adjustment thereof and a plate mounted on said holder to arrest the movement of said block during the operation of said screw.

WILLIAM C. BREDENBECK.